(12) United States Patent
Kim

(10) Patent No.: US 8,196,715 B2
(45) Date of Patent: Jun. 12, 2012

(54) DISK BRAKE FOR VEHICLE

(75) Inventor: Joo Gon Kim, Deajeon (KR)

(73) Assignee: Mando Corporation, Gyeonggi-Do (KR)

( * ) Notice: Subject to any disclaimer, the term of this patent is extended or adjusted under 35 U.S.C. 154(b) by 974 days.

(21) Appl. No.: 12/133,950

(22) Filed: Jun. 5, 2008

(65) Prior Publication Data

US 2009/0020377 A1   Jan. 22, 2009

(30) Foreign Application Priority Data

Jul. 19, 2007   (KR) .................. 10-2007-0072257

(51) Int. Cl.
*F16D 55/08* (2006.01)
*F16D 65/00* (2006.01)

(52) U.S. Cl. ............. 188/72.7; 188/70 B; 188/72.2; 188/156

(58) Field of Classification Search ........... 188/70 B, 188/71.1, 72.1, 72.2, 72.6, 72.7, 72.8, 73.1, 188/156, 157, 324, 343
See application file for complete search history.

(56) References Cited

U.S. PATENT DOCUMENTS

| | | | |
|---|---|---|---|
| 5,107,967 A | 4/1992 | Fujita et al. | 188/72.1 |
| 6,139,460 A * | 10/2000 | Drennen et al. | 188/72.1 |
| 6,978,868 B2 * | 12/2005 | Schautt | 188/72.7 |
| 7,143,873 B2 | 12/2006 | Pascucci et al. | 188/72.7 |
| 7,364,021 B2 * | 4/2008 | Baumann et al. | 188/72.7 |
| 2004/0011603 A1 * | 1/2004 | Yokoyama et al. | 188/72.7 |
| 2004/0041468 A1 | 3/2004 | Obersteiner et al. | 303/119.2 |
| 2006/0131115 A1 * | 6/2006 | Han | 188/72.2 |
| 2006/0290201 A1 * | 12/2006 | Kawahara et al. | 303/162 |
| 2010/0140030 A1 * | 6/2010 | Kim | 188/156 |

FOREIGN PATENT DOCUMENTS

| | | |
|---|---|---|
| DE | 102005055445 A1 | 5/2007 |
| KR | 10-2004-0023800 | 3/2004 |

* cited by examiner

*Primary Examiner* — Melody Burch
(74) *Attorney, Agent, or Firm* — McDermott Will & Emery LLP

(57) ABSTRACT

Disclosed is a disk brake for a vehicle having a power transmission device that presses a friction pad against a disk by using a worm gear. The disk brake includes a movable friction pad that makes contact with one lateral side of a disk rotating together with a vehicle wheel, thereby generating braking force, a wedge member, which is provided at one side thereof with the movable friction pad and moves toward the disk by means of a driving motor generating a driving force, a guide member for guiding the wedge member such that the wedge member moves back and force relative to the disk; and a power transmission device installed between the driving motor and the guide member so as to convert the driving force of the driving motor into a linear movement in a direction perpendicular to a rotating shaft of the driving motor.

6 Claims, 3 Drawing Sheets

DISK BRAKE FOR VEHICLE

This application claims the benefit of Korean Patent Application No. 10-2007-0072257 filed on Jul. 19, 2007, in the Korean Intellectual Property Office, the disclosure of which is incorporated herein by reference.

BACKGROUND OF THE INVENTION

1. Field of the Invention

The present invention relates to a brake for a vehicle. More particularly, the present invention relates to a disk brake for a vehicle having a power transmission device that presses a friction pad against a disk by using a worm gear.

2. Description of the Related Art

In general, a disk brake for a vehicle generates braking force by pressing friction pads against both sides of a disk, which rotates together with a wheel. Such a disk brake for a vehicle includes friction pads that make contact with both sides of a disk rotating together with a vehicle wheel to generate braking force, a wedge member, which is provided at one side thereof with the friction pad and moves toward the disk by means of a driving motor that generates driving force, and a guide member which guides the wedge member such that the wedge member can move toward the disk being rotated. The wedge member is inserted between the disk and the guide member so that great braking force can be obtained even if low power is applied during the braking operation.

In addition, the disk brake for the vehicle further comprises a power transmission device, which moves toward the disk by means of the driving motor to allow the wedge member to move toward the disk being rotated.

In order to allow the power transmission device to move toward the disk, a male screw is formed around a rotating shaft of the driving motor and a shaft hole having a female screw is formed at an inner peripheral portion of the power transmission device. Thus, the power transmission device can move back and forth relative to the disk according to the rotational direction of the rotating shaft of the driving motor. Such a conventional disk brake requires a brake booster, which reduces deviation through deceleration and increases braking force when the braking operation is performed by using rotational force of the driving motor. The brake booster may include a pair of wedge members having inclined surfaces facing each other.

However, if the wedge members are used as the brake booster, although great braking force can be obtained through the self-energization, there is great variation in the braking force, so that the braking operation cannot be easily controlled. In addition, vibration and shock, which are generated when the friction pads make contact with the disk, may be transferred to the driving motor through the wedge members. Further, if repulsive force is applied to the rotating shaft of the driving motor, the driving motor may malfunction.

SUMMARY OF THE INVENTION

Accordingly, it is an aspect of the present invention to provide a disk brake for a vehicle, capable of easily controlling braking force.

It is an another aspect of the present invention to provide a disk brake for a vehicle, capable of preventing external impact, such as vibration and shock, from being directly applied to a driving motor during the braking operation.

Additional aspects and/or advantages of the invention will be set forth in part in the description which follows and, in part, will be apparent from the description, or may be learned by practice of the invention.

The foregoing and and/or other aspects of the present invention are achieved by providing a disk brake for a vehicle, the disk brake comprising: a movable friction pad that makes contact with one lateral side of a disk rotating together with a vehicle wheel, thereby generating braking force; a wedge member, which is provided at one side thereof with the movable friction pad and moves toward the disk by means of a driving motor generating a driving force; a guide member for guiding the wedge member such that the wedge member moves back and force relative to the disk; and a power transmission device installed between the driving motor and the guide member so as to convert the driving force of the driving motor into a linear movement in a direction perpendicular to a rotating shaft of the driving motor.

The power transmission device includes a worm integrally formed with the rotating shaft of the driving motor, a worm wheel engaged with the worm, a screw spindle extending by passing through a center of the worm wheel so as to rotate according to rotation of the worm wheel, and a transfer member which linearly moves in an axial direction of the spindle screw and is fixed to the guide member.

The transfer member includes a nut.

The transfer member includes a ball screw.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
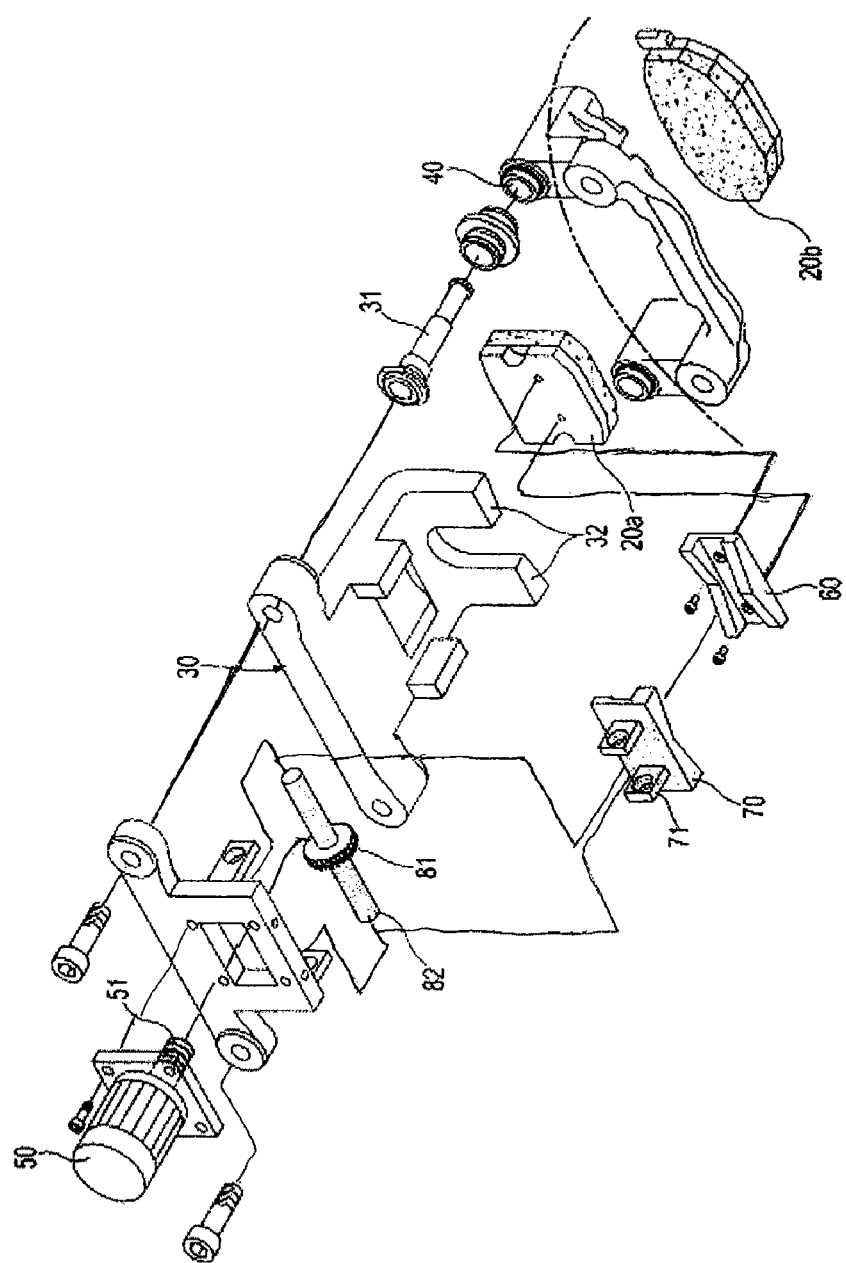
FIG. 1 is an exploded perspective view showing a disk brake for a vehicle according to the present invention.

Reference will now be made in detail to the embodiments of the present invention, examples of which are illustrated in the accompanying drawings, wherein like reference numerals refer to the like elements. The embodiments are described below to explain the present invention by referring to the figures.

Hereinafter, an exemplary embodiment of the present invention will be described in detail with reference to the accompanying drawings.

Figure 2:
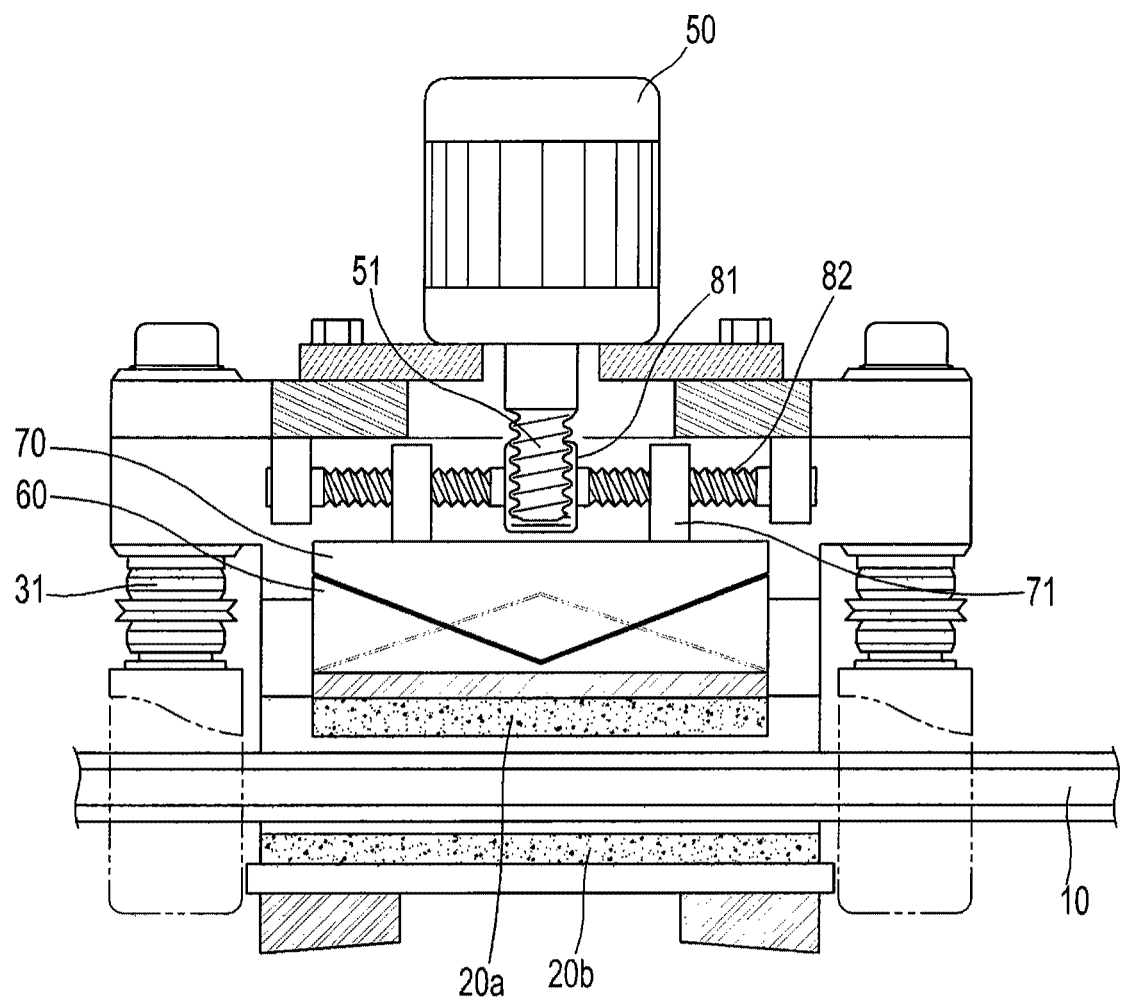
FIG. 2 is a schematic sectional view showing a disk brake for a vehicle according to the present invention.
Figure 3:
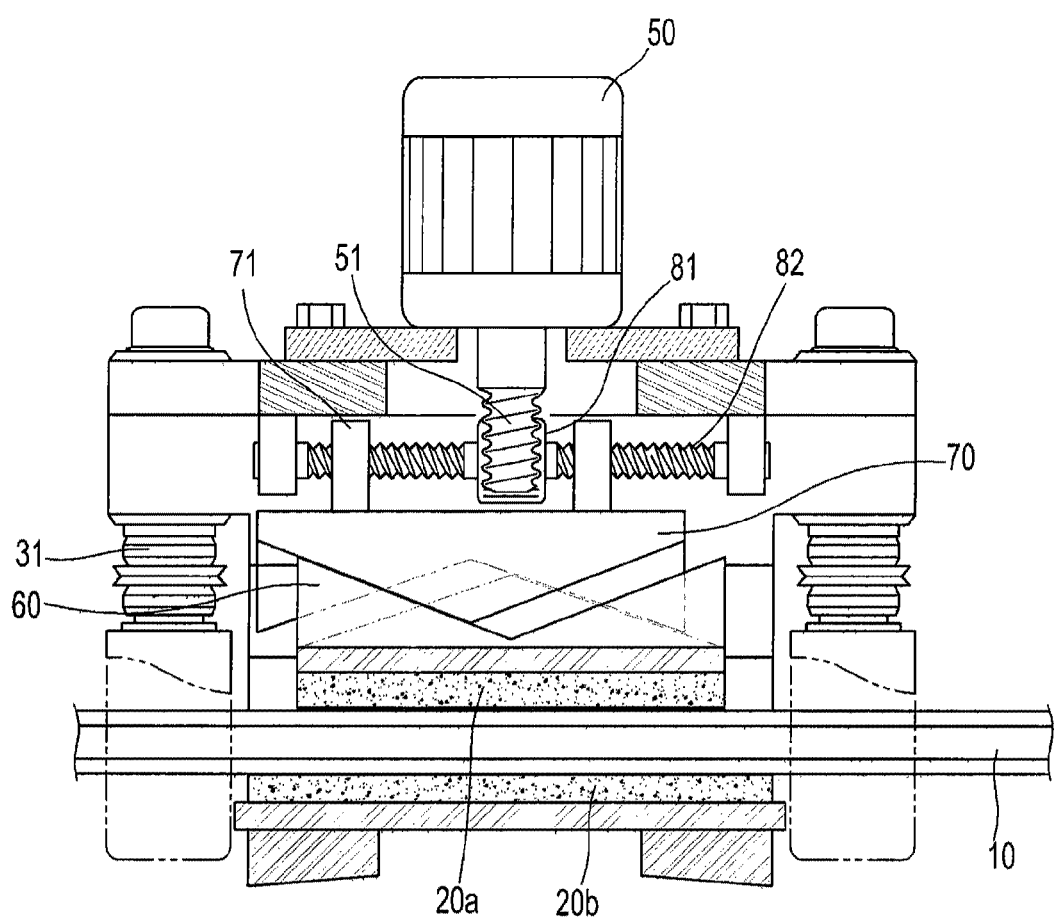
FIG. 3 is a schematic sectional view showing the braking state of the disk brake shown in FIG. 2.

As shown in FIGS. 1 and 2, a disk brake for a vehicle according to the present invention generates braking force by pressing friction pads 20*a* and 20*b* against both sides of a disk 10 which rotates together with a vehicle wheel (not shown). The disk brake includes a caliper housing 30, in which a pair of friction pads 20*a* and 20*b* are installed in opposition to each other, and a carrier 40 fixed to a knuckle part (not shown) of the vehicle such that the caliper housing 30 can move back and forth relative to the knuckle part.

In order to allow the caliper housing 30 to move back and forth relative to the carrier 40, a pair of guide rods 31, which are movably installed on the carrier 40, are fixed to both lateral sides of the caliper housing 30 by means of a fastening member, such as a screw, and guide holes 41 are formed at both sides of the carrier 40 such that the guide rods 31 can move back and forth through the guide holes 41.

A wedge member 60 is provided at one side in the caliper housing 30 and the friction pad 20*a* is attached to a front surface of the wedge member 60, which faces the disk 10. In addition, a guide member 70 is installed in the caliper housing 30 such that a front surface of the guide member 70 can directly or indirectly make contact with a rear surface of the wedge member 60. The guide member 70 linearly moves by receiving power from a driving motor 50 in order to guide the wedge member 60 toward the disk 10.

A finger member 32 is installed at the other side in the caliper housing 30 and the friction pad 20b is attached to the finger member 31. In the present embodiment, the friction pad 20a, which is attached to the wedge member 60 so as to move together with the wedge member 60, will be referred to as a movable friction pad, and the friction pad 20b attached to the finger member 32 will be referred to as a fixed friction pad for the purpose of convenience.

The front surface of the wedge member 60 is disposed in parallel to one lateral side of the disk 10 such that the movable friction pad 20a can uniformly make contact with the lateral side of the disk 10, and the rear surface of the wedge member 60 has an inclined configuration relative to the disk 10 such that at least one lateral side of the wedge member 60 may form a wedge shape.

A front surface of the guide member 70 is inclined correspondingly to the rear surface of the wedge member 60 in order to guide the wedge member 60 toward the disk 10 being rotated.

In addition, a power transmission device is provided between the guide member 70 and the driving motor 50 in order to convert the rotational force of the driving motor 50 into the linear movement of the guide member 70.

The power transmission device includes a worm 51 integrally formed with the rotating shaft of the driving motor 50, a worm wheel 81 engaged with the worm 51, a screw spindle 82 extending by passing through the center of the worm wheel 81 so as to rotate according to rotation of the worm wheel 81, and a transfer member 71 which linearly moves in the axial direction of the spindle screw 82 and is fixed to the guide member 70.

The transfer member 71 may include a nut or a ball screw, which can linearly move along the screw spindle 82, and can be integrally formed with the guide member 70.

Thus, when the wedge member 60 moves toward the disk 10 by means of the driving force of the driving motor 50, the rear surface of the wedge member 60 is guided by the front surface of the guide member 70 so that the wedge member 60 can be forwarded toward the disk 10. Therefore, the movable friction pad 20a attached to the wedge member 60 is pressed against one lateral side of the disk 10 being rotated, thereby generating braking force. In addition, if the movable friction pad 20a is pressed against the disk 10, the caliper housing 30 moves back in opposition to the wedge member 60 due to repulsive force, so that the fixed friction pad 20b attached to the finger member 32 of the caliper housing 30 is pressed against the other lateral side of the disk 10, thereby generating the braking force.

When the movable friction pad 20a makes contact with one lateral side of the disk 10, friction may occur between the movable friction pad 20a and the disk 10. Such friction may allow the wedge member 60 to be securely inserted between the front surface of the guide member 70 and the lateral side of the disk 10, so that great braking force can be obtained even if low power is employed.

According to the present embodiment, the rear surface of the wedge member 60 has the inclined configuration, that is, the rear surface of the wedge member 60 is convex up about the center of the wedge member 60, so that wedges are formed at both lateral sides of the wedge member 60. In addition, the front surface of the guide member 70 is concave up about the center of the guide member 70 in correspondence with the shape of the wedge member 60, so that the guide member 70 can be applied to both left and right wheels of the vehicle.

Meanwhile, the braking release operation is reverse to the braking operation. That is, if the rotating shaft of the driving motor 50 reversely rotates, the guide member 70 linearly moves in parallel to the screw spindle 82 to return to its initial position. Thus, wedge member 60 also returns to its initial position so that the movable friction pad 20a is separated from the disk 10, thereby releasing the braking operation. In this manner, if the movement of the wedge member 60 is guided according to the linear movement of the guide member 70, the braking operation can be easily controlled. In addition, the driving motor 50 is not directly connected to the wedge member 60 even though the driving motor 50 is connected to the guide member 70 through the power transmission device, the shock derived from the movement of the wedge member 60 may not be transferred to the driving motor 50. Further, sine the power transmission device adopts the worm gear structure, the power transmission device adopts the worm gear structure, the worm 82 is not rotated by the worm wheel 81, so that the driving motor 50 can be protected from external impact.

In the disc brake according to the present invention, the guide member is linearly moved by the power transmission device employing the worm gear structure to operate the wedge member having the movable friction pad.

Therefore, great braking force can be obtained due to the worm gear, the nut and ball screw and the braking operation can be easily controlled. In addition, since the friction pad is indirectly operated through the guide member, the driving motor can be protected from external impact.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk brake for a vehicle, the disk brake comprising:
  a movable friction pad that makes contact with one lateral side of a disk rotatable together with a vehicle wheel, thereby generating braking force;
  a wedge member, which is provided at one side thereof with the movable friction pad and moves toward the disk so that said moveable friction pad contacts the disk by means of a driving motor generating a driving force;
  a guide member for guiding the wedge member such that the wedge member moves back and forth relative to the disk; and
  a power transmission device installed between the driving motor and the guide member so as to convert the driving force of the driving motor into a linear movement of the guide member in a direction perpendicular to a rotating shaft of the driving motor.

2. The disk brake as claimed in claim 1, wherein the power transmission device includes a worm integrally formed with the rotating shaft of the driving motor, a worm wheel engaged with the worm, a screw spindle extending by passing through a center of the worm wheel so as to rotate according to rotation of the worm wheel, and a transfer member which linearly moves in an axial direction of the spindle screw and is fixed to the guide member.

3. The disk brake as claimed in claim 2, wherein the transfer member includes a nut.

4. The disk brake as claimed in claim 2, wherein the transfer member includes a ball screw.

5. The disk brake as claimed in claim 1, wherein the power transmission device converts the driving force of the driving motor into the linear movement in a direction parallel to said disk.

6. The disk brake as claimed in claim 1, wherein the power transmission device converts the driving force of the driving motor into the linear movement in the direction perpendicular to the rotating shaft of the driving motor so that opposing surfaces of said guide member and said wedge member are in sliding contact.

* * * * *